United States Patent [19]

Sakaue et al.

[11] Patent Number: 5,044,518
[45] Date of Patent: Sep. 3, 1991

[54] SEEDING DEVICE

[75] Inventors: Osamu Sakaue, Morioka; Tsuyoshi Sekimura, Iwate; Seiichi Shimoda, Takizawa, all of Japan

[73] Assignee: Director General of the Touhoku National Agriculture Experiment Station, Morioka, Japan

[21] Appl. No.: 497,276

[22] Filed: Mar. 22, 1990

[30] Foreign Application Priority Data

Mar. 31, 1989 [JP] Japan .................................. 1-082522

[51] Int. Cl.⁵ ............................................. B65H 3/44
[52] U.S. Cl. ........................................ 221/95; 221/99; 221/268
[58] Field of Search ...................... 221/226, 92, 95, 93, 221/98, 99, 123, 268, 273, 124; 111/925, 104, 105

[56] References Cited

U.S. PATENT DOCUMENTS 4,101,284  7/1978  Difiglio .................................. 221/95
4,345,371  8/1982  Ohsawa et al. ......................... 221/93

Primary Examiner—Robert P. Olszewski
Assistant Examiner—Kenneth Noland
Attorney, Agent, or Firm—Armstrong, Nikaido, Marmelstein, Kubovcik & Murray

[57] ABSTRACT

A seed container has a plurality of partition plates for dividing the container into a plurality of spaces and a brush provided in each space in parallel with the partition plate. A cell plate having a plurality of cells is provided in a bottom of the seed container, and a receiving plate having a plurality of apertures corresponding to the cells is provided under the cell plate. The cell plate is reciprocated so as to reciprocate each row of the cells over the corresponding brush. When each cell coincides with a corresponding aperture, a seed in the cell drops for seeding.

2 Claims, 2 Drawing Sheets

SEEDING DEVICE

BACKGROUND OF THE INVENTION

This invention relates to a seeding device for automatically seeding a seedling tray.

It is preferable to exactly and automatically seed a predetermined number of seeds into a center of each aperture of a seedling tray. However, such a seeding device which satisfies all of these aforesaid functions, has not been proposed owing to the costly price.

It is therefore the principal object of this invention to provide a seeding device in which the seeding process may be automatically performed with a simplified mechanism.

According to the present invention, there is provided a seeding device having a seeding unit and a carrier. The seeding unit comprises a seed container having a plurality of partition plates for dividing the container into a plurality of spaces and a brush provided in each space in parallel with the partition plate, a cell plate provided in a bottom of the seed container so as to be reciprocated and having a plurality of cells arranged in a row at one side of the brush in each of the spaces, a receiving plate securely provided under the cell plate and having a plurality of apertures corresponding to the cells, reciprocating means for reciprocating the cell plate so as to reciprocate each row of the cells over the corresponding brush to coincide each cell with a corresponding aperture, a plurality of pipes connected to the receivig plate at the underside thereof, each of the pipe being communicated with a corresponding aperture, and a shutter plate for receiving seeds dropped from the cell plate through the pipes and for dropping the received seeds for the seeding thereof.

In an aspect of the invention, the seeding unit is vertically movably mounted in the carrier, and a winch is provided on the carrier for lowering the seeding unit for performing seeding.

The other objects and features of this invention will become understood from the following description with reference to the accompanying drawings.

DETAILED DESCRIPTION OF THE PREFERRED EMBODIMENT

Figure 1:
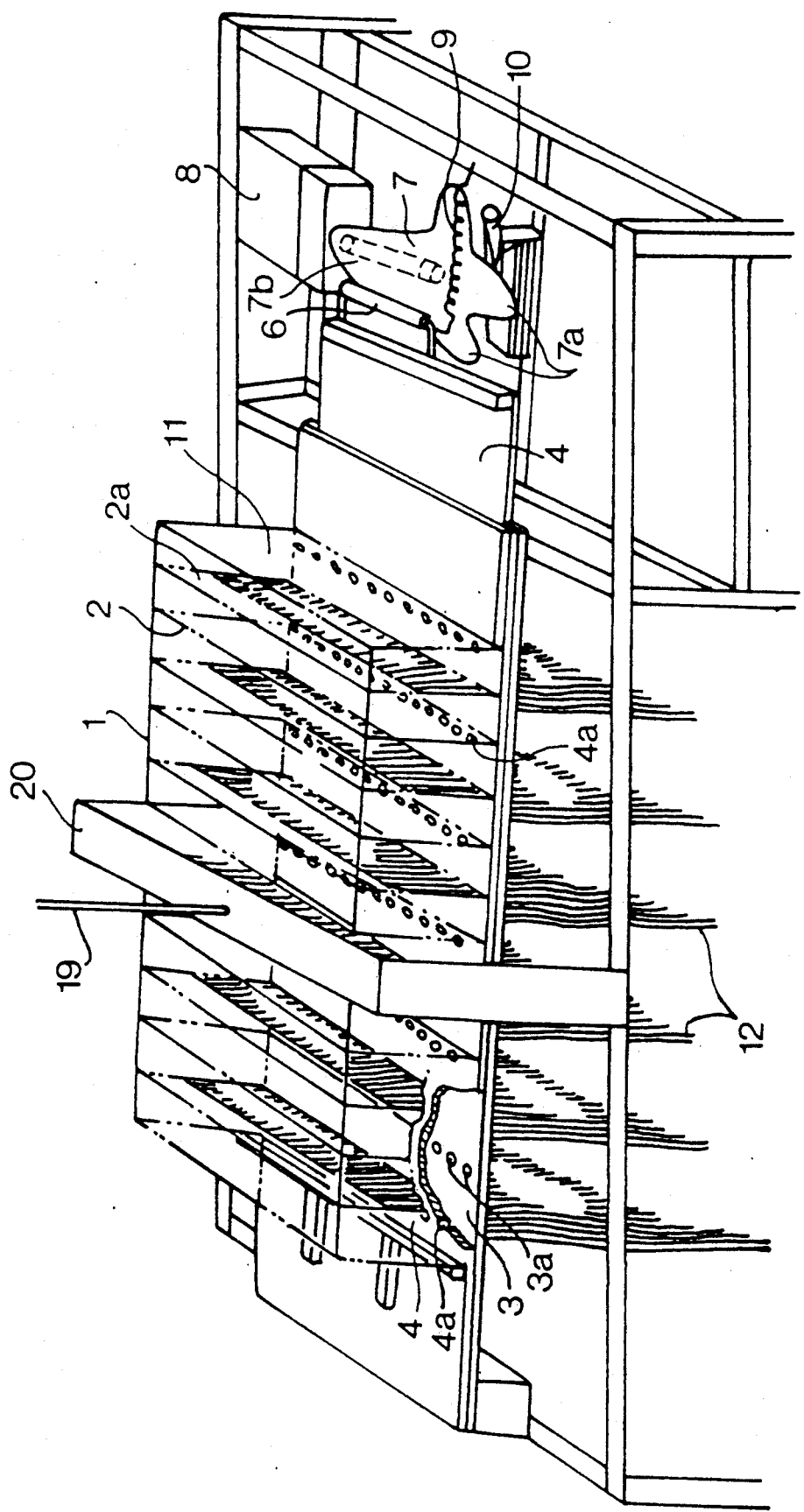
FIG. 1 is a perspective view of a seeding unit of the present invention.
Figure 2:
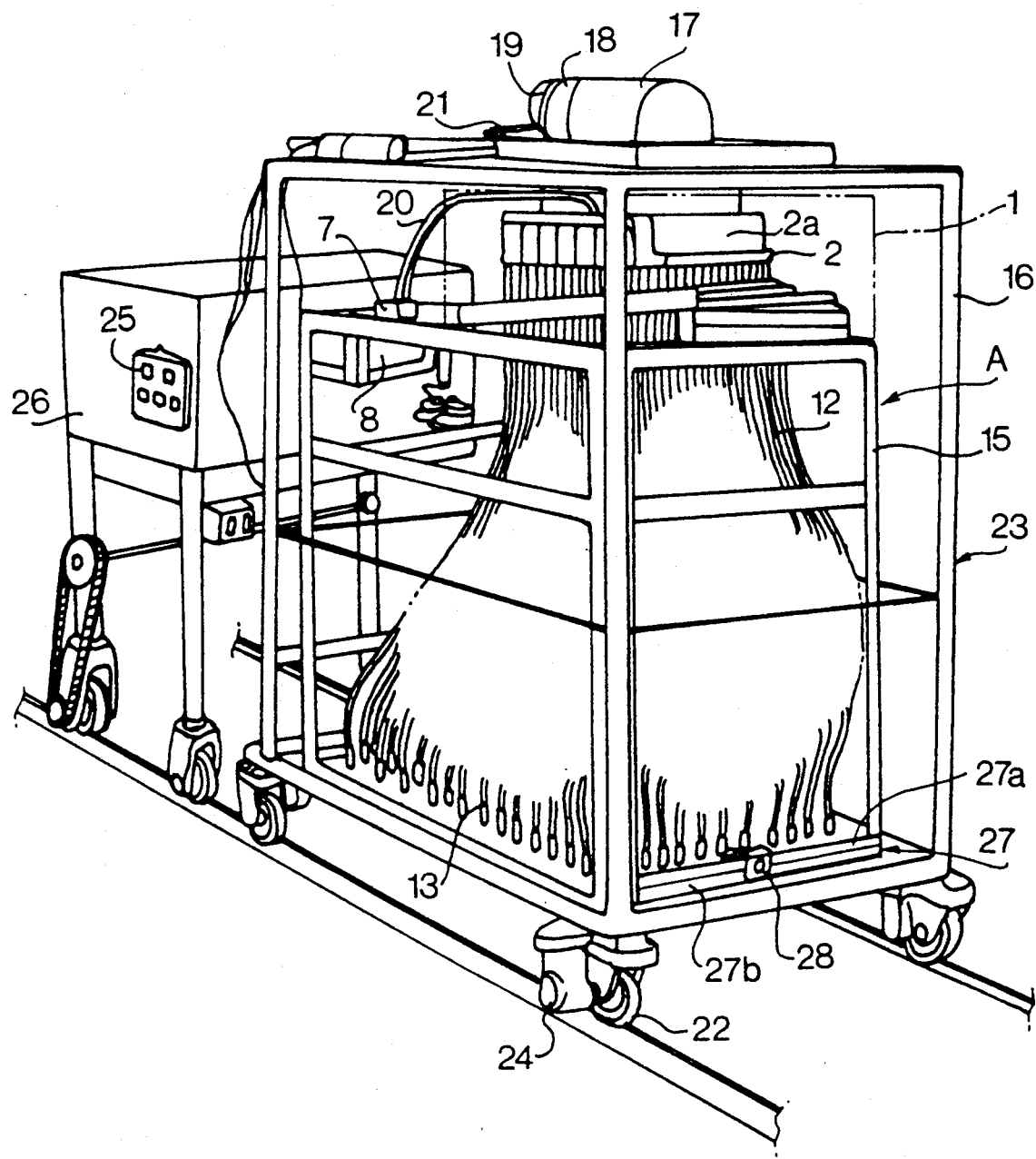
FIG. 2 is a perspective view showing the seeding device in an operating state.

A seeding unit A is provided in a frame 15. A seed container 1 is provided in the frame 15, in which a plurality of partition plates 2a and brushes 2 are vertically provided, each brush 2 being disposed between the adjacent partition plates 2a in parallel with the plate 2a. In the seed container coated seeds 11 are accommodated in each space between the plates 2a. A cell plate 4 is provided in the bottom of the seed container 1 so as to be shifted forward and backward. A plurality of cells 4a are formed in the cell plate at each space in parallel with the brushes 2 at one side thereof. The forward shifting stroke of the plate 4 is effected by the driving force of a rotary cam 7 driven with an electronic motor 8. A roller 6 provided on the plate 4 at an end thereof is resiliently engaged with the cam 7 by a return spring 9. The circular cam 7 has three small lobes 7a, each of which has an equal radius of curvature to one another, and has a large lobe 7b having a little longer radius of curvature than that of the lobes 7a. During one rotaion of the cam 7, the cell plate 4 is reciprocated three times, so that each row of the cells 4a may be reciprocated over the corresponding brush 2. Under the cell plate, a receiving plate 3 is securely provided. In the receiving plate a plurality of apertures 3a are formed so that each aperture 3a coincides with corresponding cell when the cell plate 4 is advanced by the small lobe 7a.

When the cell plate 4 is at a waiting position, each cell 4a accomodates a grain of seed. When the cell plate 4 is advanced by the small lobe 7a, each seed drops through cell 4a and aperture 3a and onto a shutter plate 27 through a vinyl pipe 12. The shutter plate 27 comprising a reciprocating plate 27a and a receiving plate 27b has the same construction as the cell plate 4 and the receiving plate 3. Thus, only a grain of the seed from each of cells 4a may be dropped at every rotation of the cam 7. A microswitch 10 is provided for detecting the number of revolution of the cam 7, which is operated by the long lobe 7b.

The number of grains of the dropped seed is increased by increasing the number of rotation of the cam 7 and the number of seeded grains may be monitored by counting the input of microswitch 10.

The operation of this seeding device will be now described as follows.

The seeding device is connected to a seeding robot 26 and travelled with wheels 22 by operating a controller 25. When an optical sensors 24 detects a frame of a seedling tray, the advance travelling of the device is immediately stopped. The seeding unit A is lowered on the frame of the seedling tray by a winch 17 driven by an electronic motor 18.

The cell plate 4 is reciprocated by the cam 7, so that the coated seeds are dropped one by one onto the shutter plate 27 through each of vinyl pipes 12. The reciprocating plate 27a of the shutter plate 27 is reciprocated by a pair of solenoids 28. Thus each grain of seed drops on the soil in the seedling tray. Since each seed is received by the shutter plate, the seed is prevented from scattering on the soil in the seedling tray. The seedling unit A is lifted with a wire 19 of the winch 17. The lifting is stopped when a lifting position sensor 21 operates. The seeding unit A is shifted to the next seedling tray by means of the robot 26. One row of the seeding is completed by repeating the above operating steps. The robot 26 is automatically backwards shifted when the robot detects an end of the row of seedling trays and the robot is returned to the starting position.

The seeding device has a length of 705 mm, a width of 460 mm and a height of 820 mm, further, its gross weight is 20 kgf. The seeding unit A has a length of 610 mm, a width of 330 mm and a height of 660 mm, further, its total weight is 6 kgf. The following data were obtained by employing 5 mm as the pore diameter of cell 4a:

| Kinds of Coated Seeds available for Seeding | Respective average Grain Sizes |
| --- | --- |
| Broccoli A | 3.5 ± 0.12 mm |
| Broccoli B | 3.3 ± 0.10 mm |
| Cauliflower | 3.3 ± 4.42 mm |
| Lettuce | 4.3 ± 0.17 mm in length diameter |
| | 3.2 ± 0.09 mm in breadth diameter |

Further, for the coated seeds of the Broccoli, the working efficiency and accuracy is exemplarily indicated in Table 1.

TABLE 1

| | Working efficiency | |
|---|---|---|
| | Hand seeding | Seeding device |
| Required time for seeding one seedling tray | 1 min. 34 secs. | 15 secs. |
| Return-time | — | 6 secs. |
| Hand adjusting time | — | 5 secs. |
| Total | 1 min. 34 secs. | 26 secs. |
| Accuracy for seeding Seeding device (72 pores) | | |
| 0 grain | | 1 (1.4%) |
| 1 grain | | 70.5 (97.9%) |
| 2 grains | | 0.5 (0.7%) |

*Each of these numerical values designates the mean value of 5 seedling trays.

From the foregoing, it will be understood that the working efficiency of the seeding device is 4 times as that of the hand seeding and the seeding errors inherent in its working procedure of the device are extremely small. Furthermore, with respect to the seeded positions within the seedling position, 94.0% of the seedlings is within a radius of 0.5 mm from the pore center of cell 4a, 5.3% of the seedlings is within a radius of 0.5 mm–1.0 cm from the center and 0.7% is within a radius of 1.0 cm. These percentage exhibit higher accuracy than a device without a shutter plate, the percentages of which are 42.8%, 41.0% and 16.2%.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A seeding device having a seeding unit and a carrier, the seeding unit, comprising:
    a seed container having a plurality of partition plates for dividing the container into a plurality of spaces and a brush provided in each space in parallel with the partition plates;
    a cell plate provided in a bottom of the seed container so as to be reciprocated and having a plurality of cells arranged in a row at one side of the brush in each of the spaces;
    a receiving plate securely provided under the cell plate and having a plurality of apertures corresponding to the cells;
    reciprocating means for reciprocating the cell plate so as to reciprocate each row of the cells over the corresponding brush to coincide each cell with a corresponding aperture;
    a plurality of pipes connected to the receiving plate at the underside thereof, each of the pipes being communicated with a corresponding aperture; and
    a shutter plate for receiving seeds dropped from the cell plate through the pipes and for dropping the received seeds for the seeding thereof.

2. A seeding device according to claim 1, wherein the seeding unit is vertically movably mounted in the carrier, and a winch is provided on the carrier for lowering the seeding unit for performing seeding.

* * * * *

UNITED STATES PATENT AND TRADEMARK OFFICE
CERTIFICATE OF CORRECTION

PATENT NO. : 5,044,518
DATED : September 3, 1991
INVENTOR(S) : SAKAUE et al

It is certified that error appears in the above-identified patent and that said Letters Patent is hereby corrected as shown below:

On the cover page, item [73], please change "Agriculture" to --Agricultural--.

Signed and Sealed this

Sixth Day of July, 1993

Attest:

MICHAEL K. KIRK

Attesting Officer

Acting Commissioner of Patents and Trademarks